Dec. 23, 1941.  V. H. REMINGTON ET AL  2,267,255
COLORING MATERIAL
Filed Sept. 30, 1936

Inventors
Victor H. Remington and Ray Andrews.

By

Attorneys

Patented Dec. 23, 1941

2,267,255

UNITED STATES PATENT OFFICE 2,267,255

COLORING MATERIAL

Victor Hawthorne Remington and Ray Andrews, Washington, Pa., assignors to B. F. Drakenfeld & Co. Inc., New York, N. Y., a corporation of New York Application September 30, 1936, Serial No. 103,451

7 Claims. (Cl. 106—49)

This invention relates to an improvement in coloring material for the decoration of surfaces of glass, porcelain, vitreous enamel, china, and the like, and to the method of decorating surfaces with such coloring material.

One of the objects of our invention is to provide a coloring material consisting essentially of what is known in the art as an ice, and a glass color mixed therewith, substantially the entire amount of material initially used in making up the coloring material being present in the finished product. This is a great advantage over the previous practice followed, in which, of the material initially used to make up the colored ice, only about 25% became available in the finished product. Previously it has been the practice to mix the ice with the glass color and sinter the mixture. The sintered product was then crushed and screened to satisfactory fineness. By this method, only about 25% of the material was recovered, due to the losses engendered by the fines.

Another object of our invention is to provide a decorating material which is more uniform than that obtained by the prior process. In such prior process the grinding of the sintered material necessarily resulted in the breaking up of the particles and in cleavages which exhibited lack of coloring matter. On the contrary, by our process, the particles of the ice each became uniformly coated with the particles of the coloring matter, so that when applied to the article to be decorated, no surfaces of the ice particles are left uncovered by the coloring matter, thus resulting in a more uniformly colored finished article.

Another object of our invention is to provide a coloring material for decorating glassware and the like, in which the permanent fixation of the color particles with reference to the ice particles, does not take place until the firing of the article in the decorating leer.

Figure 1:
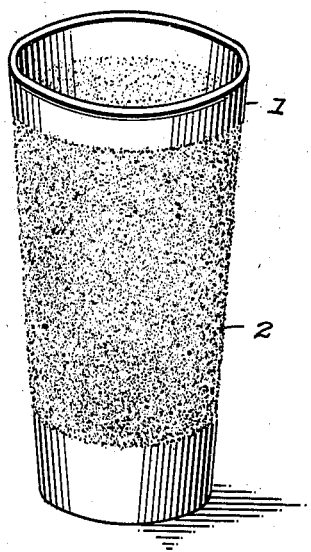

With these and other objects of our invention in mind, which will more particularly appear as the description proceeds, reference is had to the following description, and to the accompanying drawing, in which, Figure 1 illustrates a glass or tumbler having a surface thereon colored and decorated in accordance with our invention.

Figure 2:
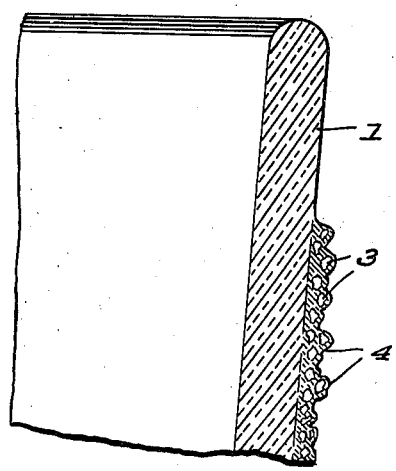

Figure 2 represents an enlarged sectional view through a portion of Figure 1, illustrating the ice particles adhering to each other, and to the glass surface, with the particles of color in permanently fused condition.

"Ice," as used in the art, is understood to be a sized flux, that is, a melted flux which has been ground and screened to definite size to get rid of the fines produced by the grinding. The compounds used in the production of this material are usually lead oxide, silicon dioxide, and boric acid.

According to our present invention, we prepare a coloring material, for instance, a colored ice in the following manner, The proper proportions, for instance, thirty pounds, of crystal ice, and the proper proportion, for instance, 1.3 pounds of glass color, in the case of blue color, for instance, being a mixture of flux and pigment, in which cobalt is the coloring matter, are thoroughly mixed together. To this mixture, the proper proportions of a binder and a solvent therefor, for instance 180 c. c. of clear dammar varnish mixed with three pounds of ether, are added, the entire mixture being thoroughly and uniformly stirred. The ether following the mixing of the ingredients together, is extracted, either by allowing it to volatilize, or otherwise. The mixture is then placed in a drier and subjected to a temperature in the neighborhood of 200° to 300° F. After being dried, the mixture is thoroughly broken up and screened through a forty or sixty mesh screen. The coloring material prepared in this way, is then ready for use.

In applying the coloring material to an article, for instance, a glass tumbler, the portions of the tumbler to be colored are coated with a suitable substance to which the mixture will adhere, for instance, balsam of copaiba or other suitable substance such as fat oil, dammar varnish or printing oil, whereupon the coloring material is dusted on, the particles thereof adhering to the coating.

Thereupon the article is subjected to the usual heat treatment in the decorating leer.

When subjected to the heat treatment in the leer, the ice softens and adheres to the surface to which the adhesive coating has been applied, and the particles of glass color, previously held on to the ice particles by the binder used, melt and become a part of the ice being fused thereto and to the surface of the article.

In this manner, full advantage is taken of the mechanical mixing of the ingredients previous to the firing, resulting in a uniformity of color on the finished article. It will be noted that no fritting of the materials is required prior to the application of the coloring material to the article before it goes into the leer.

In preparing the material we may use if so desired, an unfluxed pigment in the place of the glass color.

It is the theory of our invention that the mixing of the materials as previously described results in the particles of ice becoming coated with a film of the binder (varnish), this action being aided by the dilutent (ether), each particle of ice becoming coated with particles of the coloring matter (glass color), which are caused through the medium of the binder to adhere thickly and uniformly to the ice particles. The temperature treatment following the volatilization of the dilutent results in all the volatile matter being driven off, and the fixation of the residue of the binder onto the ice particles, with the particles of coloring matter adhering therein, thus fixing the coloring matter onto the ice particles. After the material is applied to the article to be decorated, and is subjected to the temperature of the decorating leer (in which leer the temperature is gradually raised from room temperature to about 1,050° F.), the volatile organic matters of the coating which was applied to the article are first driven off and thereafter fusion takes place, which results in the coloring matter and the ice particles fusing together and to the glass surface, the coloring matter thus becoming permanently fixed to the article to be decorated.

The surface of the article 1 thus colored presents a uniformly roughened or stippled effect to the eye as indicated at 2, in Fig. 1, and is rough to the touch although being without sharp or cutting edges or corners. In the case of a tumbler or the like the colored surface affords an excellent surface whereby to grip or lift the article as it will not readily slip in the grasp. In Figure 2, which is very much enlarged, the glass tumbler is indicated at 1, the particles of ice at 3, and particles of glass color fused together and to the ice particles and to the tumbler are indicated at 4. It will be understood that the drawing is merely indicative, and does not purport to illustrate the exact proportions of particles of ice or color or the exact degree of fusion obtained in practice.

Having thus described our invention what we claim is:

1. A composition for compounding coloring material for ornamenting surfaces of glass or the like comprising a mixture of substantially thirty pounds of ice in the form of small granular particles, 1.3 pounds of powdered glass color for coating said granular particles, and 180 c. c. of white dammar varnish and a diluent for the varnish adapted to diffuse the powdered glass color and bind the same intimately upon said granular particles.

2. A composition for compounding coloring material for ornamenting surfaces of glass and the like comprising a mixture of vitreous crystal ice in the form of small granular particles, a powdered glass color, a binder and a diluent for the binder adapted to diffuse the powdered glass color and bind the same intimately upon said granular particles.

3. A composition for compounding coloring material for ornamenting surfaces of glass and the like comprising a mixture of vitreous crystal ice in the form of small granular particles, an unfluxed powdered pigment, a binder and a diluent for the binder adapted to diffuse the powdered pigment and bind the same upon said granular particles.

4. The process of preparing coloring material for ornamenting surfaces which comprises mixing vitreous ice in the form of screened granular particles with a powdered pigment in the presence of a binder and a diluent therefor to cause said pigment to adhere intimately to the surfaces of said granular particles, drying the mixture, and separating the coated granular particles.

5. The process of preparing coloring material for ornamenting surfaces which comprises mixing vitreous crystal ice in the form of granular particles with a powdered pigment in the presence of a binder and a volatile diluent therefor to cause said powdered pigment to adhere intimately to the surfaces of said granular particles, extracting the volatile diluent, drying the mixture at a temperature of 200°–300° F., and separating the coated granular particles by screening.

6. The process of preparing coloring material for ornamenting surfaces which comprises mixing vitreous crystal ice in the form of granular particles with a powdered glass color in the presence of a binder and a volatile diluent therefor to cause said glass color to adhere intimately to the surfaces of said granular particles, extracting the volatile diluent, drying the mixture at a temperature of 200°–300° F., and separating the coated granular particles.

7. The process of preparing coloring material for ornamenting surfaces which comprises mixing vitreous crystal ice in the form of granular particles with a powdered glass pigment in the presence of a binder and a volatile diluent therefor to cause said glass pigment to adhere intimately to the surfaces of said granular particles, eliminating the volatile diluent, drying the mixture to drive off the residual diluent and to fix the binder and powdered pigment upon the granular particles, and separating the coated granular particles from one another.

VICTOR HAWTHORNE REMINGTON.
RAY ANDREWS.